United States Patent
Chiu et al.

(10) Patent No.: US 10,907,553 B2
(45) Date of Patent: Feb. 2, 2021

(54) DUAL FUEL GENERATOR

(71) Applicant: Kohler Co., Kohler, WI (US)

(72) Inventors: Harrison C. Chiu, Grafton, WI (US);
Peter Thompson, Cleveland, WI (US);
Seth Gudmundson, Sheboygan, WI (US); Zachary David Meulemans, Valders, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 16/839,196

(22) Filed: Apr. 3, 2020

(65) Prior Publication Data

US 2020/0318556 A1  Oct. 8, 2020

Related U.S. Application Data

(60) Provisional application No. 62/829,779, filed on Apr. 5, 2019.

(51) Int. Cl.
*F02D 19/06* (2006.01)
*H02P 9/04* (2006.01)
(Continued)

(52) U.S. Cl.
CPC ............. *F02D 19/06* (2013.01); *F02D 29/06* (2013.01); *H02P 9/04* (2013.01); *H02P 2101/25* (2015.01)

(58) Field of Classification Search
CPC . F02D 19/06; F02D 29/06; H02P 9/04; H02P 2101/25
(Continued)

(56) References Cited

U.S. PATENT DOCUMENTS 4,278,064 A * 7/1981 Regueiro ............ F02D 19/0621
123/577
5,224,457 A 7/1993 Arsenault
(Continued)

FOREIGN PATENT DOCUMENTS

DE  10248228 A1  4/2003
GB  1410525 A  10/1975

OTHER PUBLICATIONS

PCT International Search Report and Written Opinion of International Searching Authority, corresponding to PCT International Application No. PCT/US2020/026541 dated Jul. 20, 2020.

*Primary Examiner* — Pedro J Cuevas
(74) *Attorney, Agent, or Firm* — Lempia Summerfield Katz LLC

(57) ABSTRACT

A control circuit for a dual fuel generator includes a primary fuel valve to control the supply of a primary fuel, a secondary fuel valve to control the supply of a secondary fuel, a primary fuel pressure switch to detect the primary fuel, a secondary fuel pressure switch to detect the secondary fuel, and a controller. The controller is configured to receive a primary signal for availability of the primary fuel from the primary fuel pressure switch and a secondary signal for availability of the secondary fuel from the secondary and operate the primary fuel valve and the secondary fuel valve in response to the primary signal and the secondary signal. When the secondary fuel valve is open so that the secondary fuel is provided to the dual fuel generator, the control circuit is configured to ground the primary signal by connecting the primary fuel pressure switch to ground.

20 Claims, 10 Drawing Sheets

(51) Int. Cl.
*F02D 29/06* (2006.01)
*H02P 101/25* (2016.01)

(58) Field of Classification Search
USPC ....... 290/40 C; 123/198 D, 27 GE, 299, 525; 701/103
See application file for complete search history.

(56) References Cited

U.S. PATENT DOCUMENTS

| | | | | |
|---|---|---|---|---|
| 5,228,423 | A * | 7/1993 | Oikawa | F02D 13/0257 123/525 |
| 5,370,097 | A * | 12/1994 | Davis | F02D 19/061 123/526 |
| 5,379,740 | A * | 1/1995 | Moore | F02D 19/0628 123/478 |
| 5,450,832 | A * | 9/1995 | Graf | F02D 19/061 123/515 |
| 6,003,478 | A | 12/1999 | Huber | |
| 6,250,260 | B1 | 6/2001 | Green | |
| 6,276,345 | B1 * | 8/2001 | Nelson | F02M 13/08 123/525 |
| 6,382,225 | B1 * | 5/2002 | Tipton | B60K 15/00 123/514 |
| 6,494,226 | B2 * | 12/2002 | Tipton | B60K 15/00 123/514 |
| 6,543,423 | B2 | 4/2003 | Dobryden | |
| 6,591,817 | B2 * | 7/2003 | Deutsch | F02M 13/08 123/525 |
| 6,668,804 | B2 | 12/2003 | Dobryden | |
| 6,792,966 | B2 * | 9/2004 | Harvey | F02M 37/0047 123/514 |
| 7,591,253 | B2 * | 9/2009 | Martindale | F02D 19/081 123/525 |
| 7,631,556 | B2 * | 12/2009 | Moening | B60K 15/061 73/290 R |
| 8,267,064 | B2 | 9/2012 | Martin | |
| 8,342,158 | B2 * | 1/2013 | Ulrey | F02D 41/0025 123/525 |
| 8,590,510 | B2 * | 11/2013 | Surnilla | F02M 39/02 123/431 |
| 8,688,351 | B2 * | 4/2014 | Oalen | F02D 41/401 701/102 |
| 9,354,618 | B2 * | 5/2016 | Chandler | F23N 5/003 |
| 9,784,194 | B2 * | 10/2017 | Fisher | F02D 41/0025 |
| 9,988,990 | B2 | 6/2018 | Bhatt | |
| 10,167,789 | B2 | 1/2019 | Collie | |
| 10,509,372 | B2 * | 12/2019 | Chandler | F02C 9/40 |
| 10,697,398 | B2 * | 6/2020 | Collie | F02M 13/08 |
| 2001/0035215 | A1 * | 11/2001 | Tipton | B60K 15/077 137/571 |
| 2002/0134362 | A1 * | 9/2002 | Deutsch | F02M 13/08 123/575 |
| 2003/0056824 | A1 * | 3/2003 | Harvey | F02M 37/0047 137/265 |
| 2004/0139943 | A1 * | 7/2004 | Kern | F02D 41/0025 123/198 D |
| 2008/0028851 | A1 * | 2/2008 | Moening | B60K 15/061 73/290 R |
| 2009/0070008 | A1 | 3/2009 | Batenburg | |
| 2011/0168133 | A1 * | 7/2011 | Pursifull | F02D 19/0628 123/495 |
| 2011/0213545 | A1 * | 9/2011 | Oaten | F02D 41/009 701/103 |
| 2013/0047964 | A1 * | 2/2013 | Kim | F02D 19/0694 123/478 |
| 2013/0220274 | A1 * | 8/2013 | Deshpande | F02D 19/0607 123/350 |
| 2014/0202430 | A1 | 7/2014 | Monros | |
| 2014/0238340 | A1 * | 8/2014 | Dunn | F02D 19/0615 123/299 |
| 2015/0219023 | A1 | 8/2015 | Kolhouse | |
| 2016/0290247 | A1 | 10/2016 | Bhatt | |
| 2016/0363099 | A1 | 12/2016 | Collie | |
| 2017/0022910 | A1 | 1/2017 | Collie | |
| 2017/0037796 | A1 * | 2/2017 | Collie | F02D 33/003 |
| 2018/0080392 | A1 | 3/2018 | Janscha | |
| 2020/0318578 | A1 * | 10/2020 | Collie | F02M 17/10 |

* cited by examiner

Scenario: While running on Primary Fuel, Primary Fuel Becomes Unavailable, Secondary Fuel Available
Result: Secondary Turns On Scenario: While Running on Secondary, Primary Fuel Becomes Available, Then Secondary Fuel Becomes Unavailable
Result: Primary Turns On, Relay Resets Scenario: While Running on Secondary, Primary Fuel Becomes Available, Then Reset Switch Is Opened
Result: Primary Turns On, Relay Resets

DUAL FUEL GENERATOR

CROSS REFERENCE TO PRIOR APPLICATION

This application claims priority benefit of Provisional Application No. 62/829,779 filed Apr. 5, 2019, which is hereby incorporated by reference in its entirety.

FIELD

This disclosure is in the field of an engine-generator set, which may be referred to as a generator or a genset, that includes an engine and an alternator or another device for generating electrical energy or power.

BACKGROUND

One or more generators may provide power to a load through a generator bus. The generator bus is an electrical conductive path and may be selectively connected through multiple circuit breakers or other types of switches to the generators, the utility system, and other devices. To avoid interruption of power to the load, some generators may include multiple sources of fuel. When one source of fuel becomes unavailable, the generator may switch to another source of fuel. A variety of scenarios may result in switching between the multiple sources of fuel at inappropriate times.

DETAILED DESCRIPTION

Figure 1A:
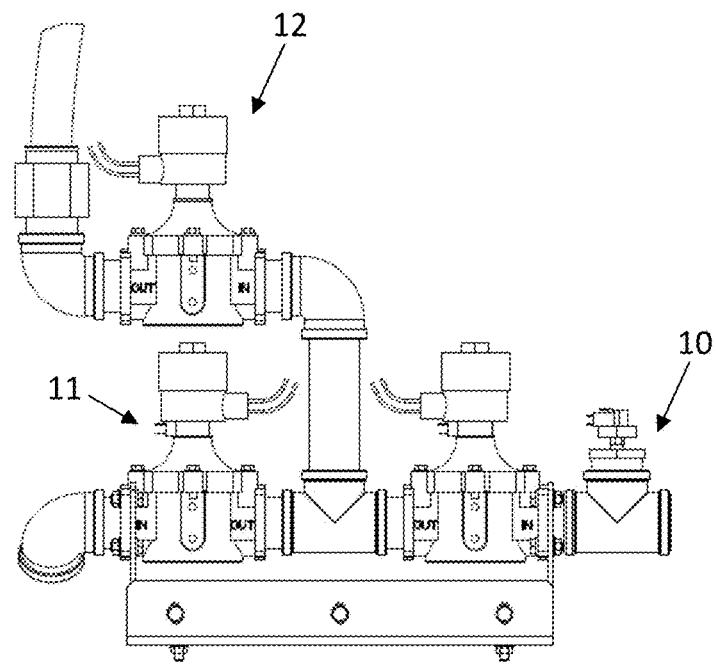
FIGS. 1A and 1B illustrate a valve system for the dual fuel generator.

A generator or generator set may include multiple fuel sources such as a primary fuel source and a secondary fuel source. The primary fuel source may be a utility fuel source (e.g., natural gas) that is provided to the generator through a pipeline system. The secondary fuel source may be stored in a tank under pressure (e.g., liquified petroleum gas). The generator may include a fuel supply inlet including at least one pipe and at least one valve for each of the multiple fuel sources (i.e., primary fuel inlet and valve for the primary fuel and secondary fuel inlet and valve for the secondary fuel). Another number of fuels may be used such as three fuels, for fuels, or more.

The generator may operate using the primary fuel source until an interruption event occurs. The interruption event may include a local malfunction in which one or more components associated with the generator and primary fuel source are not fully operational. The interruption event may include maintenance or an instruction from a technician or administrator device sent remotely to the generator. The interruption event may include intervention by a user or technician provided locally to the generator. The interruption event may be a natural event such as a seismic event that causes primary fuel source damage (pipeline, etc).

In response to the interruption event, the generator may deactivate the primary fuel source and activate the secondary fuel source. In response to the interruption event, the generator may switch from the primary fuel source to the secondary fuel source through operating one or more valves, for example, by closing the primary fuel inlet and valve and opening the secondary fuel inlet and valve. For example, in the event of a loss of a primary fuel supply, a second fuel source may be fitted to the engine, and selected either manually or with an automatic changeover system. The automatic changeover system typically uses a combination of electrically operated valves to control which fuel source is supplying the engine. Both fuel source valves are controlled by an engine controller or engine controller module (ECM). The engine control module detects availability of the primary fuel source using a pressure switch located on the supply side of the fuel valve. When pressure drops below a threshold, the pressure switch actuates, grounding the signal wire to indicate a loss of fuel. The ECM enables an output to energize the secondary fuel source solenoid, and then de-energizes the primary fuel solenoid to close the valve.

At some point, the generator switches back to the primary fuel source. This may be done automatically after a certain time period. However, some challenges may result from or are otherwise apparent due to automatically switching back to the primary fuel source and may include leaking, backfiring, or other malfunctions of the generator. Specifically, commercially available gas valves allow for a small amount of reverse leakage. In a dual fuel system that is operating on a secondary fuel source, the secondary fuel may leak through the primary fuel valve into the depleted primary fuel source's fuel lines. In such an instance, a pressure switch monitoring the primary fuel source may provide a false positive signal to the ECM. When this occurs, the engine controller detects that the primary fuel source has returned, and subsequently switches the engine's fuel source from secondary to primary fuel. This may result in causing the engine to stutter and potentially, cause shutdown or disablement of the system. Similar outcomes may occur when the primary fuel source is available, but with low or inconsistent pressure.

The following embodiments include a control system for a dual fuel generator that prevents undesired automatic switching of the fuel source of the generator. A feedback control circuit is employed to override the primary fuel source feedback signal when the engine has selected a secondary fuel source, thereby preventing nuisance fuel changeover events and increasing overall system reliability. As described in more detail below, an additional pressure switch may be installed on the supply side of the secondary fuel source.

Figure 1B:
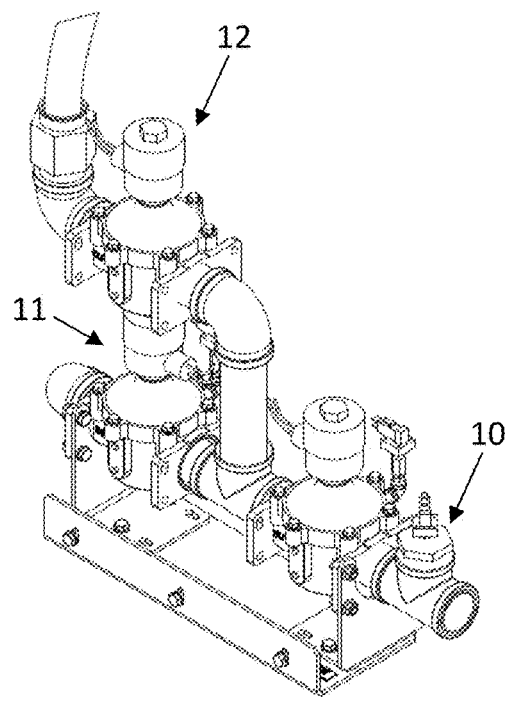

FIGS. 1A and 1B illustrate a valve system for the dual fuel generator. The valve system for the dual fuel generator includes at least two valves, a primary fuel valve 10 and a secondary fuel valve 11. As illustrated, the valve system for the dual fuel generator includes three valves, which also includes a supply valve 12 downstream of both the primary fuel inlet and the secondary fuel inlet.

Figure 2A:
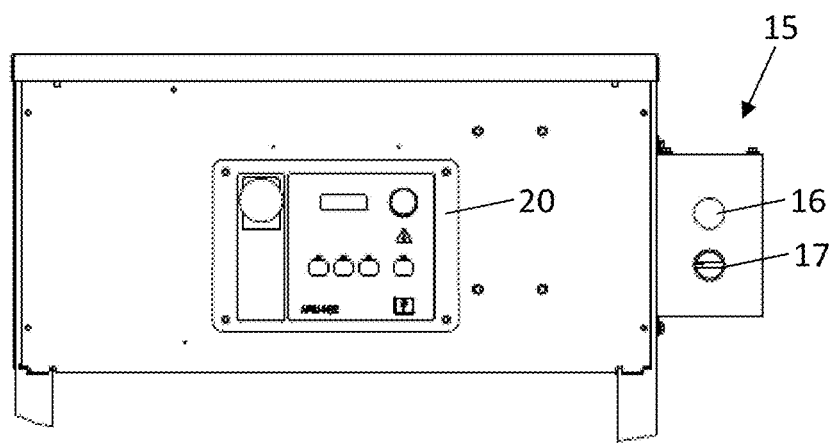
FIGS. 2A and 2B illustrate a control system for the dual fuel generator.
Figure 2B:
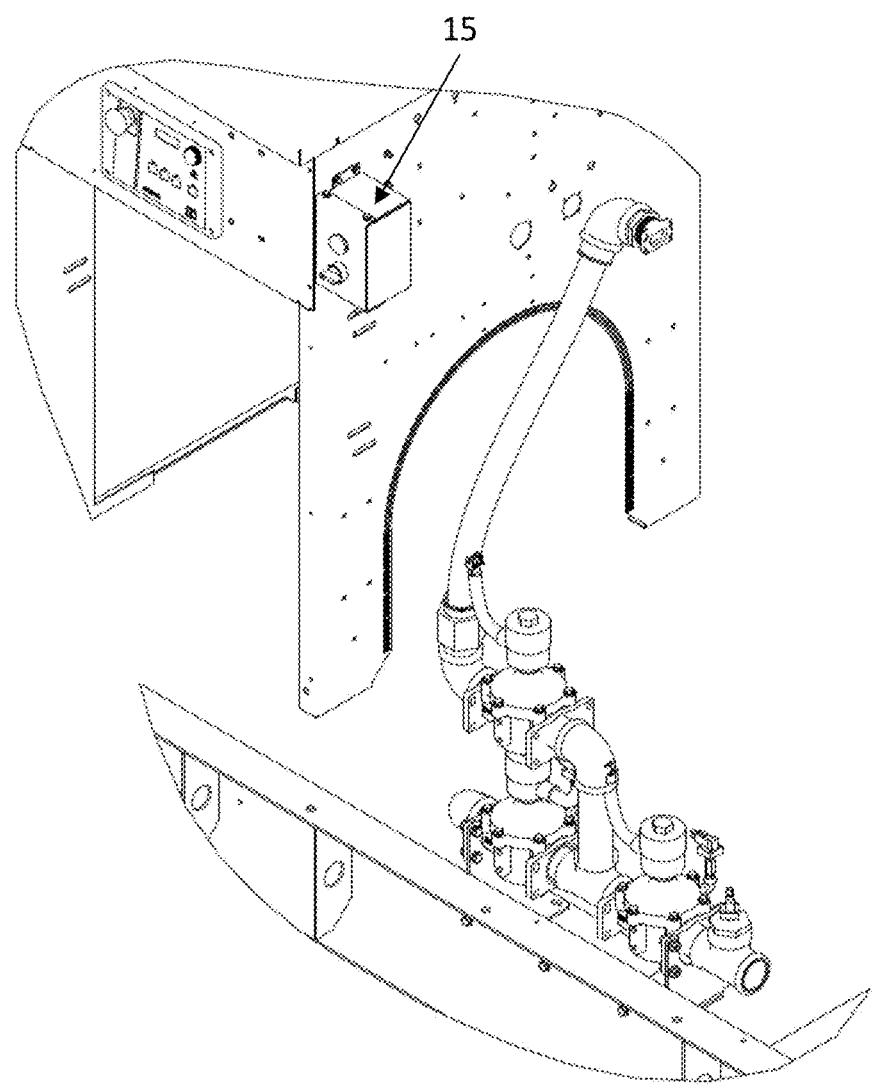

FIGS. 2A and 2B illustrate a control system for the dual fuel generator. The control system includes an engine controller (e.g., engine control module), one or more switches, and one or more indicators. As illustrated, the control system includes an operator control interface 15 including a dual fuel reversion switch 17 and an illuminator 16. The illuminator 16 may be a light, light emitting diode, or lamp that indicates when the secondary fuel source is activated. The light indicates that the secondary fuel source is in use and that the control system is currently configured to receive the command from the user to initiate the generator switching from the secondary fuel source to the primary fuel source. Alternatively, the function of the illuminator 16 may be performed by a display screen (e.g., user interface).

Additional inputs to the control system may be provided through main interface 20. The operator control interface is configured to receive a command from a user (e.g., technician) to initiate the generator switching from the secondary fuel source to the primary fuel source. The control system prevents the automatic transition from the secondary fuel source to the primary fuel source until the operator control interface receive the command from the user.

Figure 2C:
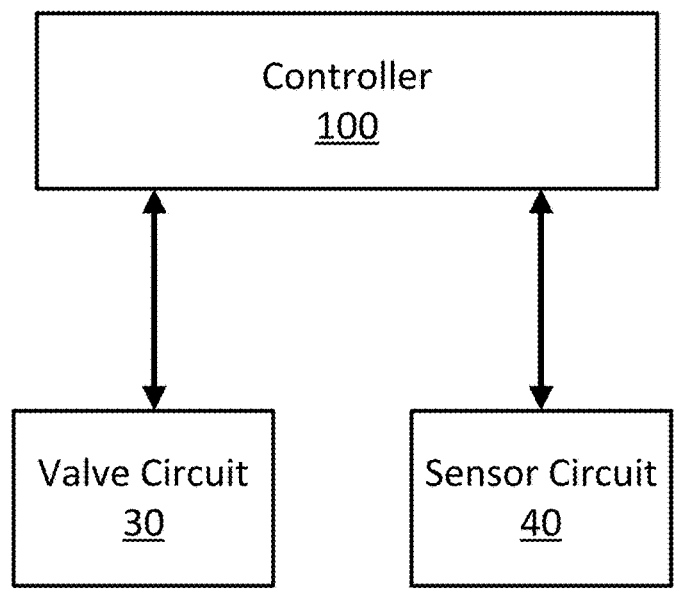
FIG. 2C illustrates an embodiment of the control system for the dual fuel generator.

FIG. 2C illustrates an example control system and/or control circuit including engine controller 100, driving circuit 30 and sensing circuit 40. The engine controller 100 may be an engine control module (ECM) or engine control unit (ECU) configured for one or more other engine functions. For example, the engine controller 100 may generate timing signals for one or more cylinders for a combustion cycle, control air to fuel ratio based on sensor measurements, control idle speed, control valve timing, and/or other functions. Other systems in the engine may include a fuel tank, a fuel line, a retractable starter, a starter handle, an air cleaning system, a muffler, a control portion, a governor system, a throttle system, and a lubrication system.

Alternatively, rather than the engine controller 100 the control circuit may include a generator controller configured for one or more other functions of a generator. The generator controller may perform field signal control, load balancing, generator paralleling, generator synchronization, or other generator functions. Other components of the generator may include a rotor, a stator, and field windings.

Figure 2D:
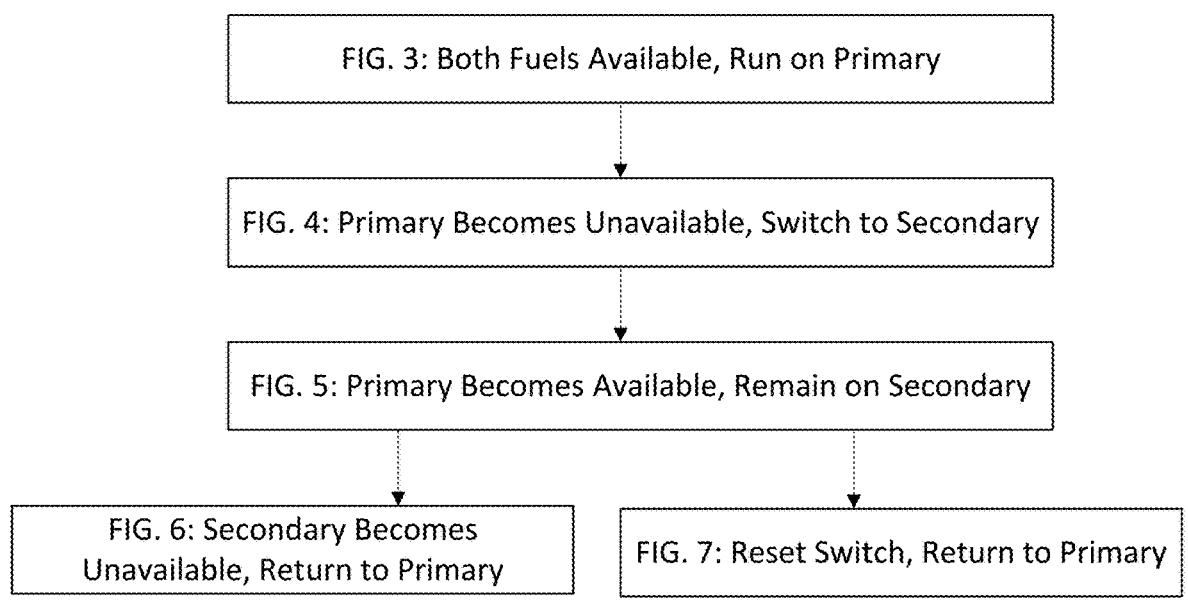
FIG. 2D illustrates an example sequence for the scenarios of FIGS. 3-7.
Figure 3:
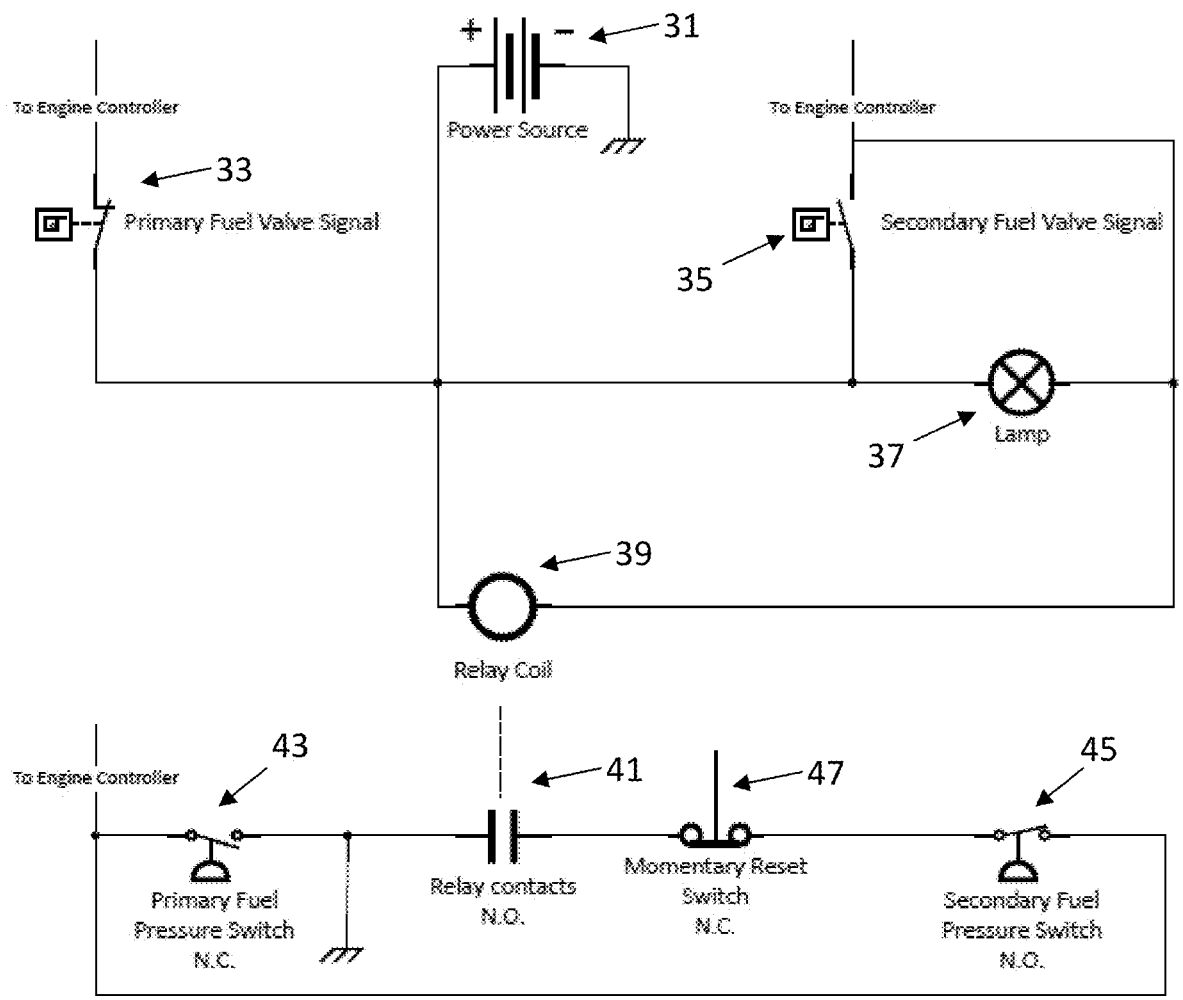
FIG. 3 illustrates a first scenario for a control circuit for the control system of the dual fuel generator.
Figure 4:
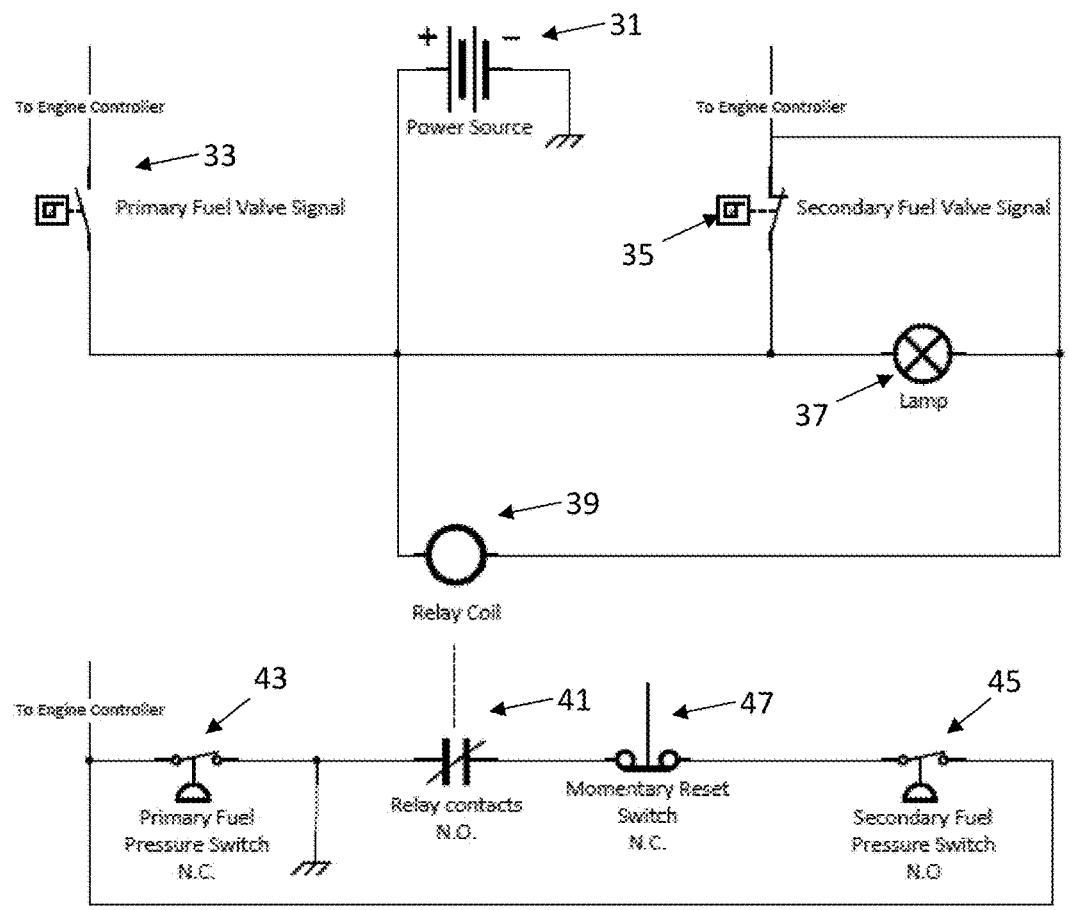
FIG. 4 illustrates a second scenario for a control circuit for the control system of the dual fuel generator.
Figure 5:
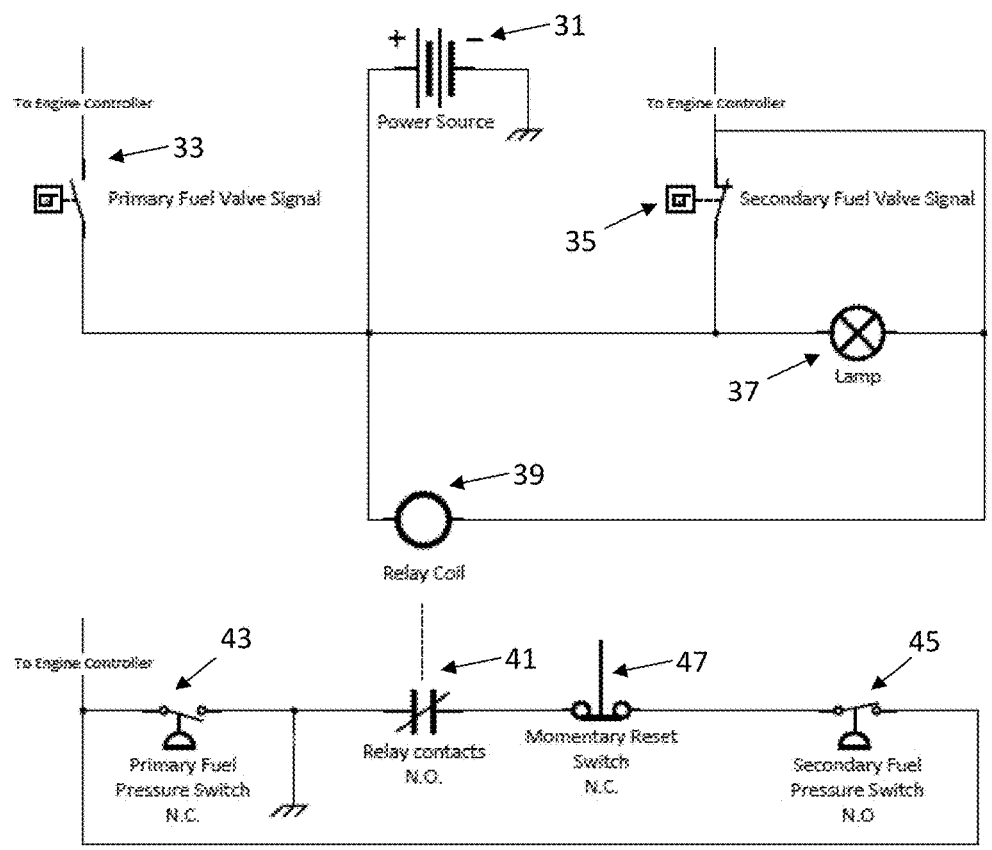
FIG. 5 illustrates a third scenario for a control circuit for the control system of the dual fuel generator.
Figure 6:
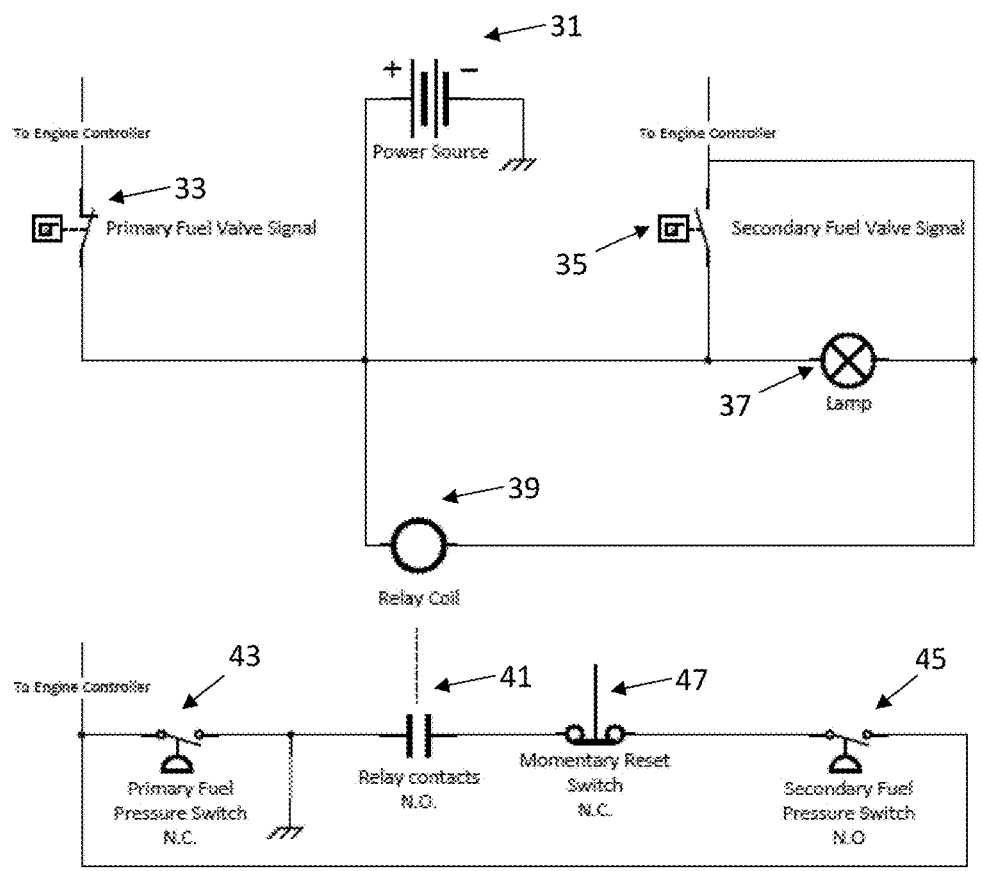
FIG. 6 illustrates a fourth scenario for a control circuit for the control system of the dual fuel generator.
Figure 7:
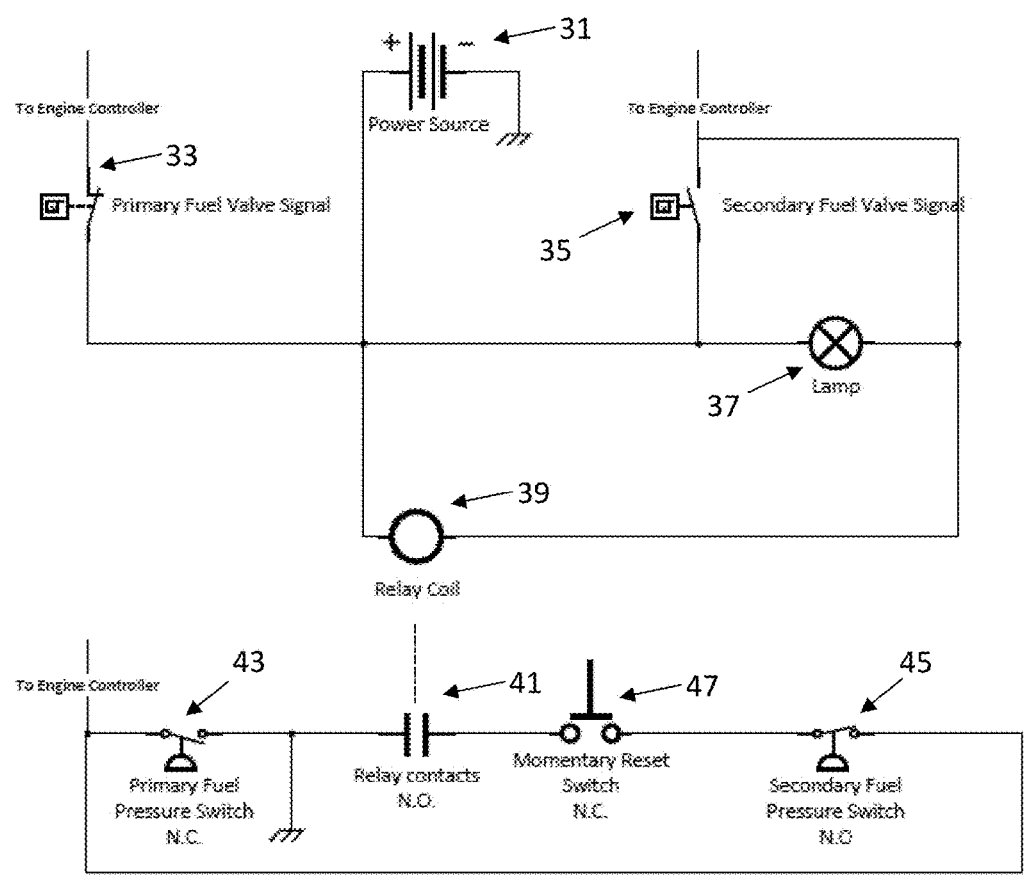
FIG. 7 illustrates a fifth scenario for a control circuit for the control system of the dual fuel generator.

FIG. 2D illustrated the sequence of events depicted in FIGS. 3-7 for the control circuit or the control system of the dual fuel generator. In FIG. 3, the initial state, the both fuels are available and the generator is running on the primary fuel. In FIG. 4, the primary fuel becomes unavailable, and the generator switches to the secondary fuel. In FIG. 5, the primary fuel becomes available, but the generator remains using the secondary fuel. Three subsequent options are possible. First, as shown in FIG. 6, the secondary fuel becomes available, and the generator switches back to the primary fuel. Second, as shown in FIG. 7, a user or a signal indicates a reset, which causes the generator to switch back to the primary fuel. Third, another external event, such as a remote command, user intervention, or unavailable of all fuel sources, causes the generator to shut down.

The control circuit may include a driving circuit 30 that is at least partially electrically isolated from a sensing circuit 40. The driving circuit 30 provides at least a primary fuel valve signal and a secondary fuel valve signal to the engine controller. The control circuit includes a power source 31 coupled to one or more relay coils 39 and the indicator or illuminator 37 (e.g., lamp). In the sensing circuit, on the control side of the relay, are relay contacts 41, which may be normally open relay contacts. The sensing circuit 40 may also include a user switch (e.g., momentary reset switch 47), a primary fuel pressure switch 43 (e.g., pressure sensor) and a secondary fuel pressure switch 45 (e.g., pressure sensor). The primary fuel pressure switch 43 detects the existing of fuel pressure in the primary inlet or other pipe associated with the primary fuel source. The secondary fuel pressure switch 45 detects the existing of fuel pressure in the secondary inlet or other pipe associated with the secondary fuel source. The primary fuel pressure switch 43 is a sensor that detects whether the primary fuel source is available. The secondary fuel pressure switch 45 is a sensor that detects whether the secondary fuel source is available. It should be noted that normally closed relay contacts may be used with corresponding changes in the circuit to maintain the logical sequences described herein.

FIG. 3 illustrates an initial scenario in which both the primary fuel supply and the secondary fuel supply are available to the generator. In the initial scenario, the control circuit provides the primary fuel valve signal for a primary fuel valve to the controller 100. The controller 100 may include a corresponding primary fuel valve switch to control the supply of a primary fuel to the dual fuel generator via the primary fuel valve. The primary fuel valve signal maintains the primary fuel valve open in order to provide the primary fuel to the generator.

FIG. 4 illustrates a primary fuel unavailable scenario that occurs after the initial scenario. In the primary fuel unavailable scenario, the primary fuel is unavailable due to an interruption of event such as loss of utility, leak, or user intervention. The availability of primary fuel may be detected by the primary fuel pressure switch. In response, the control circuit provides the secondary fuel valve signal, corresponding to the secondary fuel valve, to the engine controller 100. The controller 100 may include a secondary fuel valve switch to control the supply of a secondary fuel to the dual fuel generator via a secondary fuel valve. The secondary fuel valve signal maintains the secondary fuel valve open in order to provide secondary fuel to the generator. In addition, in the primary fuel unavailable scenario, the relay contacts are closed, which turns on the illuminator 37, which is powered through the power source 31.

FIG. 5 illustrates a scenario in which after the interruption event has occurred, the primary fuel source becomes available again. In this case, the generator continues to use the secondary fuel source even though the primary fuel source is available. The primary fuel pressure switch, which is normally closed, is opened, but the generator continues to use the secondary fuel source. The control circuit prevents the generator from automatically switching back to the primary fuel even though the primary fuel has become available. It should be noted that a primary fuel switch that is normally open may be used with corresponding changes in the circuit to maintain the logical sequences described herein.

The secondary fuel pressure switch 45 connected to the supply side of the secondary fuel source is open under no pressure, and the pressure switch contacts are normally closed when secondary fuel is available. Further, the common and normally closed contacts of the secondary fuel pressure switch 45 are connected to the normally closed contact of the momentary switch 47 and the feedback signal from the primary fuel pressure switch 43. It should be noted that a secondary fuel pressure switch that is normally open may be used with corresponding changes in the circuit to maintain the logical sequences described herein. Likewise, a momentary switch that is normally open may be used with corresponding changes in the circuit to maintain the logical sequences described herein.

The common contact of the momentary switch 47 connects to a normally open relay contact 41, and the common relay contact 41 is connected to system ground. The relay's coil 39 as well as illuminator 37 are connected in parallel with the secondary fuel solenoid coil. When the secondary fuel source is enabled, the illuminator 37 lights to indicate the system is operating on the secondary fuel source, and the relay contacts close, grounding the primary fuel source feedback signal. Grounding the feedback signal effectively short circuits the primary fuel pressure switch 43 to ground, such that the feedback signal to the controller 100 indicates that primary fuel is lost, regardless of the state of the primary fuel pressure switch 43. In this condition, the engine controller 100 is unable to detect the return of primary fuel pressure due to actual availability or a nuisance event. The engine will continue to operate on the secondary fuel source until another event occurs to change the state shown in FIG. 5.

FIG. 6 illustrates a scenario in which after the interruption event and after running on secondary fuel, the secondary fuel becomes unavailable. The secondary fuel may become unavailable because the tank is empty or from a malfunction. The unavailability of the secondary fuel may be detected by the secondary fuel pressure switch. The secondary pressure switch contacts are open, which disconnects the primary pressure switch override caused by grounding the primary fuel pressure switch 43. In response to the secondary fuel being unavailable, the primary fuel valve signal is turned on. In response to the secondary fuel being unavailable, the relay resets (switched to open), which turns off the illuminator to indicate that the secondary fuel source is not in use. The engine controller 100 attempts to switch to primary fuel if it is available. If primary fuel is not available, the engine may shutdown due to loss of fuel.

FIG. 7 illustrates an internal intervention scenario in which after the interruption event, after running on secondary fuel, and after primary fuel becomes available, the switch 47 (e.g., momentary switch) is activated. The switch 47 may be physically flipped by a technician or other user in the presence of the generator. Activating the switch 47 disconnects the primary pressure switch override caused by grounding the primary fuel pressure switch 43. The switch 47 may be operated while the generator is running. In response to activation of the switch 47, the secondary fuel valve signal is turned off and the secondary fuel valve is closed. In response to the activation of the switch 47, the primary fuel valve signal is turned back on and the primary fuel is provided to the generator. In response to activation of the switch 47, the relay resets (switched to open) and the illuminator is turned off.

In the case that the controller 100 is a generator set controller, the generator set controller monitors the status of primary and secondary fuel pressures as well as status of the fuel valve solenoids. Upon loss of available primary fuel pressure, the generator set controller enables a relay, relay drive output, or other grounding output type to override the primary fuel source feedback signal. The controller may also provide diagnostic information about the fuel sources and outage events to a user locally or remotely, and may also provide indication of the active fuel source, and a means for a user to attempt a changeover back to primary fuel.

The generator controller may also determine a generator rating. Because the generator is operable on different types of fuel, the generator may also operate with different operating characteristics over time. One of the operating characteristics that may change when fuel type changes is the maximum output of the generator, which may be referred to as the generator rating. The generator rating may be variable and change between a first value when the primary fuel is used, or when the primary fuel valve is open, and a second value when the secondary fuel is used, or when the secondary fuel valve is open. In some dual fuel generators, the generator rating for LP (typically the secondary fuel) is higher than NG (typically the primary fuel).

The generator controller may calculate or determine the variable generator rating based on whether operation of the primary fuel valve or the secondary fuel valve. In one example, the generator controller determines the rating from a lookup table. In another example, the makeup of the fuel is detected by a sensor and the rating is calculated from the makeup of the fuel. The generator controller may act on the load information or send it out to switchgear or other device to make the load shed determination. Additionally, the controller may adjust its load rating based on fuel pressure or makeup.

The generator controller may initiate the changeover between the primary fuel and the secondary fuel based on load. That is, rather than a pressure switch or sensor detecting an absence in the primary fuel, the switch to the secondary fuel may be based on the load. For example, the secondary fuel may be capable of providing a higher power output, corresponding to a higher load on the generator. As described in other embodiments herein, once the generator has been changed to the secondary fuel, the control circuit may be prevent the generator from returning to the primary fuel unless certain external conditions are present. Those certain external conditions may be user input, loss of secondary fuel, and in this example, also a change in the load on the generator.

The generator controller may also control loads on the dual fuel generator based on the type of fuel that is being used. Because the output of the generator depends on fuel type, the amount of load that the generator can handle or efficiently handle also depends on the fuel type. The generator controller may receive data indicative of the loads on the generator in power. The generator may compare the loads on the generator to the determined generator rating. When the connected loads exceed a threshold, the generator controller may generate a load command that instructs one or more load to be removed from or added to the generator. The load command may be associated to a first load level when the primary fuel valve is open and a second load level when the secondary fuel valve is open.

In the case the controller 100 is an ECM, the ECM monitors the status of primary and secondary fuel pressures. Upon loss of available primary fuel pressure, the ECM performs a changeover to the secondary fuel source, and henceforth ignores the status of the primary fuel pressure switch until a button press or car area network (CAN) command is received to command an attempted changeover to the primary fuel source, or the secondary fuel pressure switch indicates secondary fuel is lost. The ECM may also provide diagnostic information about the fuel sources and outage events via local I/O pins or over the CAN bus.

In addition or in the alternative of the scenarios described with respect to FIGS. 6 and 7, an external intervention event may also occur. Rather than the manual switch to change the fuel supply back to the primary in the internal intervention, the external intervention is an automated or manual command to shut down the generator. The external intervention may be received from a user that turns off the generator. The external intervention may be received from a generator controller that provides a shutdown signal based on another factor. The generator controller may shut down the generator when it is no longer needed. For example, a utility may have come back online, the load may have changed, or another generator may have come online, rendering the generator unnecessary at the present time for the system. The external intervention may come from an error or malfunction such as loss of all fuel sources, loss of field, mechanical problems, electrical problems, or other problems.

Figure 8:
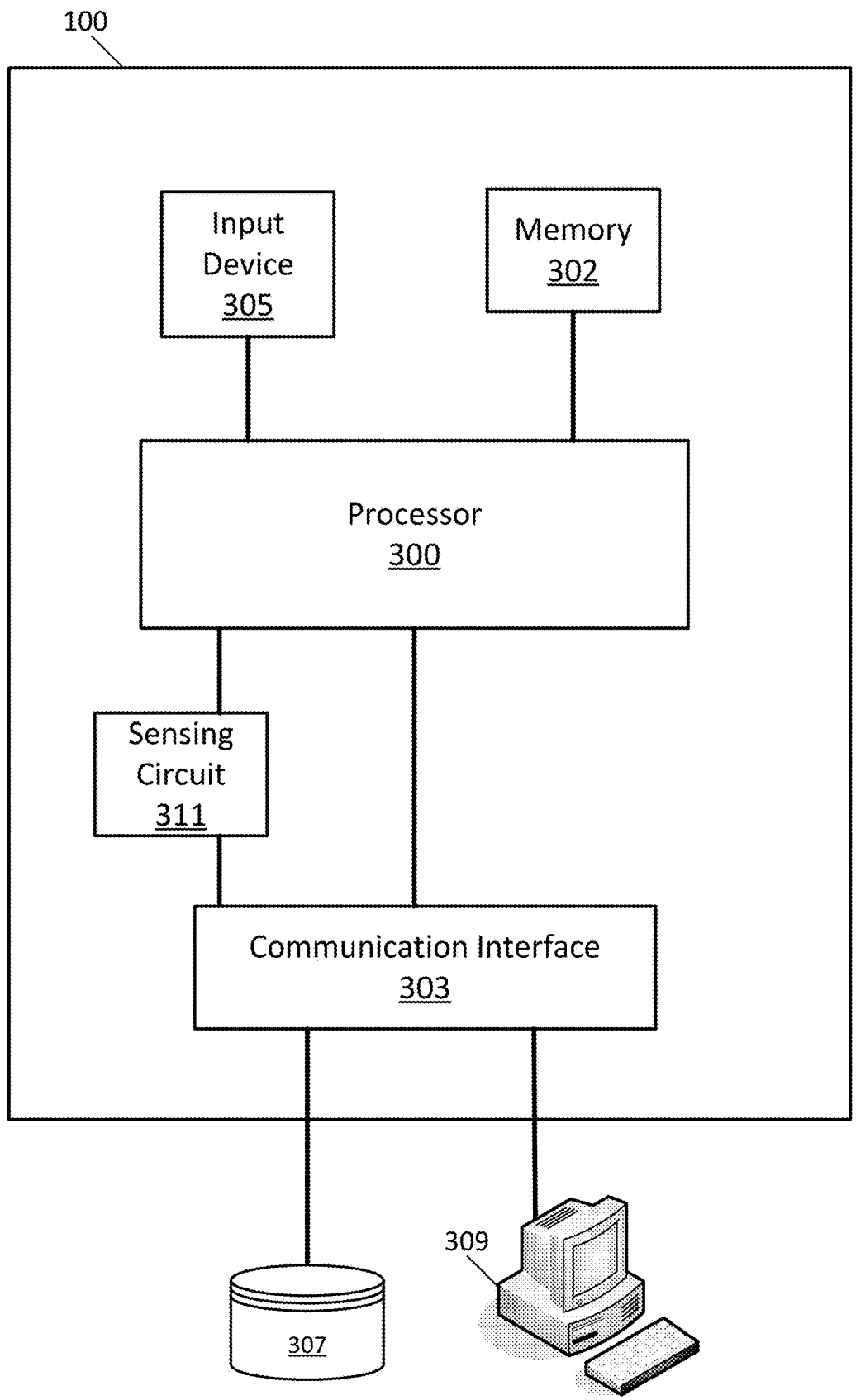
FIG. 8 illustrates an example generator controller, or engine controller, of the system of FIGS. 1-7.

FIG. 8 illustrates an example generator controller 100, or engine controller, of the system of FIGS. 1-7. The controller 100 may include a processor 300, a memory 302, and a communication interface 303. The generator controller 100 may be connected to a workstation 309 or another external device (e.g., control panel) and/or a database 307. Optionally, the generator controller 100 may include an input device 305 and/or a sensing circuit 311. The sensing circuit 311 receives sensor measurements for the operation of the primary and secondary fuel source. The input device 305 may include the momentary reset switch. The memory 302 may store instructions for analyzing the sensor data from the sensing circuit 311 and/or the inputs from the input device 305.

Figure 9:
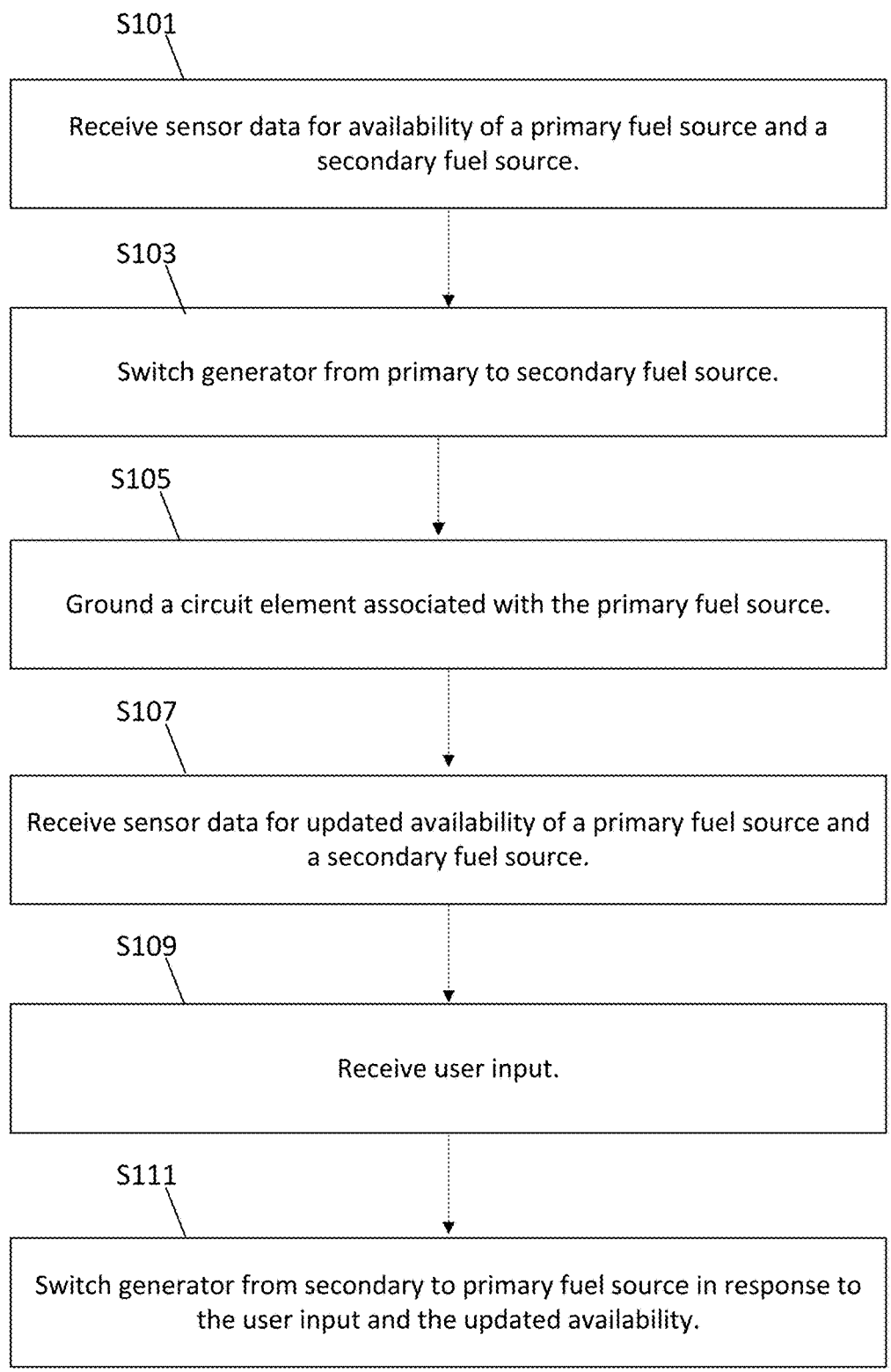
FIG. 9 illustrates an example flowchart for the control system of FIGS. 3-7 or the controller(s) of FIG. 8.

FIG. 9 illustrates an example flowchart for operation of the controller 100 and/or the system of FIGS. 1-7. The methods in FIG. 9 may, in some instances, be implemented as logic or software executable by the controller 100. Additional, different, or fewer acts may be provided. The acts may be performed in the order shown or other orders. The acts may also be repeated.

At act S101, the generator controller 100 receives sensor data from the sensing circuit 311 for the availability of the primary fuel source, or both the primary and second fuel source. The availability may be a binary value (e.g., whether or not the corresponding pressure switch is actuated). The generator controller 100 may receive a primary signal for availability of the primary fuel from the primary fuel pressure switch and a secondary signal for availability of the secondary fuel from the secondary and operate the primary fuel valve switch and the secondary fuel valve switch in response to the primary signal and the secondary signal.

At act S103, the generator controller 100 switches the generator from the primary fuel source to the secondary fuel source. The generator controller 100 may close one or more valves associated with the primary fuel source and open one or more valves associated with the secondary fuel source. The generator controller 100 may also switch one or more parameters from the first fuel source to the second source. For example, parameters for operating the engine may depend on the fuel source (i.e., the engine runs on different settings for natural gas than for liquified petroleum).

At act S105, the generator controller 100 grounds a circuit element associated with the primary fuel source in response from to the changeover from the primary fuel source to the secondary fuel source. The generator controller 100 may cause a relay to close that provides a path between the circuit element and ground. The circuit element may be a switch, a transistor, or a microcontroller. As an alternative to the circuit element, the generator controller 100 may ground a wire or other electrical connection to ground the detection of the primary fuel.

At act S107, the generator controller 100 continues the monitor the availability of the fuel sources through the sensing circuit 311. The availability of a fuel source may be determined based on pressure switch signals received at the generator controller 100 from the fuel pressure switches (e.g., primary fuel pressure switch 43 and secondary fuel pressure switch 45). The generator controller 100 may implement grounding of the primary signal when (e.g., at the same time) the secondary fuel is provided to the dual fuel generator. The generator controller 100 may connect the primary fuel pressure switch to a ground in the control circuit by opening or closing one or more electrical paths. For example, referring to the scenarios of FIGS. 3-7, the opening of the primary fuel pressure switch 43 that is normally closed provides the path to ground. In addition, closing the normally open relay contacts 41 can provide a path to ground. The relay is energized by activation of the secondary fuel valve and the relay grounds the primary signal by connecting the primary fuel pressure switch to ground.

That is, when the secondary fuel pressure switch 45 is normally closed (indicating pressure at the secondary fuel source) and the reset switch 47 is closed, a path to ground is provided to the engine controller 100 and the primary fuel pressure switch 43. In one sense, pressing the reset switch 47, generates a reset signal that disconnect the primary fuel pressure switch from ground. The reset signal activates the primary fuel valve switch and deactivate the secondary fuel valve switch in response to the user input and the detected availability of the primary fuel.

The connection of the primary fuel pressure switch 43 to ground prevents the operation of the primary fuel valve. The connection to ground causes the generator controller 100 not to detect the operation of the primary fuel pressure switch 43 even if it is closed.

The generator controller 100 may implement a switch activation time or debounce time that prevents nuisance switching. The switch activation time may be a user entered or automatically determined delay time. The generator controller 100 does not take any action upon a change in the state of the pressure switch until the change has occurred for a duration equal or greater than the delay time. The delay time is selected so that the amount of time that the pressure dips below the switch threshold is long enough to prevent nuisance switching back and forth if the pressure is hovering around the threshold for the pressure switch. Examples for the delay time may be 125 milliseconds, 250 milliseconds, 500 milliseconds, or 1 second.

The generator controller 100 may be configured for a testing routine where the user provides varying amount of fuel pressure to the pressure switches and the debouncing responses of the switches is detected by the generator controller 100. The generator controller 100 may analyze the debouncing response and select and apply a delay time that prevents a substantial portion of the debouncing responses.

At act S109, the generator controller 100 receives user input from the input device 305. The user input may be a request to return the generator to normal operation or otherwise switch to the primary fuel source. The user may depress a button or other switching device to generate the user input. Alternatively, through the communication interface 303 or workstation 309, the user may transmit the user input electronically or wireless. In one example, the user may provide the user input through a smart phone or other portable mobile device.

At act S111, the generator controller 100 switches the generator from the secondary fuel source to the primary fuel source. The generator controller 100 may open one or more valves associated with the primary fuel source and close one or more valves associated with the secondary fuel source. The generator controller 100 may first determine that primary fuel source is available and that the user input has been received, and then in response to both the availability and the user input, switch the fuel source of the generator back to the primary fuel source. In addition, the generator controller 100 may change one or more operating parameters for the engine in response to the fuel change.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 303 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 302 or database 307) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A control circuit for a dual fuel generator, the control circuit comprising:
a primary fuel valve switch to control supply of a primary fuel to the dual fuel generator via a primary fuel valve;
a secondary fuel valve switch to control supply of a secondary fuel to the dual fuel generator via a secondary fuel valve;
a primary fuel pressure switch configured to detect availability of the primary fuel;
a secondary fuel pressure switch configured to detect availability of the secondary fuel; and
a controller configured to receive a primary signal for availability of the primary fuel from the primary fuel pressure switch and a secondary signal for availability of the secondary fuel from the secondary and operate the primary fuel valve switch and the secondary fuel valve switch in response to the primary signal and the secondary signal,
wherein when the secondary fuel is provided to the dual fuel generator, the control circuit is configured to ground the primary signal by connecting the primary fuel pressure switch to ground.

2. The control circuit of claim 1, wherein the connection of the primary fuel pressure switch to ground prevents operation of the primary fuel valve switch.

3. The control circuit of claim 1, wherein the control circuit is configured to generate a reset signal that disconnect the primary fuel pressure switch from ground.

4. The control circuit of claim 3, wherein the reset signal activates the primary fuel valve switch and deactivate the secondary fuel valve switch in response to a user input and the detected availability of the primary fuel.

5. The control circuit of claim 1, wherein the controller is configured to determine a variable generator rating based on operation of the primary fuel valve or the secondary fuel valve.

6. The control circuit of claim 5, wherein the variable generator rating includes a first rating when the primary fuel valve is open and a second rating when the secondary fuel valve is open.

7. The control circuit of claim 1, wherein the controller is configured to generate a load command based on operation of the primary fuel valve or the secondary fuel valve.

8. The control circuit of claim 7, wherein the load command is associated to a first load level when the primary fuel valve is open and a second load level when the secondary fuel valve is open.

9. The control circuit of claim 1, further comprising:
a relay energized by activation of the secondary fuel valve, wherein the relay grounds the primary signal by connecting the primary fuel pressure switch to ground.

10. The control circuit of claim 1, further comprising:
an indicator configured to indicate that the secondary fuel valve switch is activated.

11. The control circuit of claim 1, further comprising:
a momentary switch configured to, when activated, disconnect the ground from the primary signal.

12. A method comprising:
receiving sensor data for availability of at least a primary fuel source of a dual fuel generator;
performing a changeover from the primary fuel source to a secondary fuel source of the dual fuel generator; and
grounding a circuit element associated with the primary fuel source in response from to the changeover from the primary fuel source to the secondary fuel source.

13. The method of claim 12, wherein a changeover from the secondary fuel source to the primary fuel source is prevented from the grounding of the circuit element associated with the primary fuel source.

14. The method of claim 12, further comprising:
receiving updated sensor data for the availability of at least the primary fuel source, the updated sensor data indicating that the primary fuel source is operational, wherein a changeover from the secondary fuel source to the primary fuel source is prevented from the grounding of the circuit element associated with the primary fuel source.

15. The method of claim 12, further comprising:
receiving a reset signal to stop the grounding of the circuit element associated with the primary fuel source.

16. The method of claim 15, wherein the reset signal is generated by a switch actuation.

17. The method of claim 12, further comprising:
determining a variable generator rating based on operation of the primary fuel source or the secondary fuel source, wherein the variable generator rating describes an output of the dual fuel generator.

18. The method of claim 12, further comprising:
generating a load command based on operation of the primary fuel source or the secondary fuel source, wherein the load command connects or disconnects a load for the dual fuel generator.

19. A dual fuel generator comprising:
a primary fuel valve to control supply of a primary fuel to the dual fuel generator via a primary fuel valve;
a secondary fuel valve to control supply of a secondary fuel to the dual fuel generator via a secondary fuel valve;
a primary fuel pressure switch configured to detect availability of the primary fuel;
a secondary fuel pressure switch configured to detect availability of the secondary fuel; and
a control circuit configured to receive a primary signal for availability of the primary fuel from the primary fuel pressure switch and a secondary signal for availability of the secondary fuel from the secondary and operate the primary fuel valve switch and the secondary fuel pressure switch in response to the primary signal and the secondary signal,
wherein when the secondary fuel is provided to the dual fuel generator, the control circuit is configured to ground the primary signal by connecting the primary fuel pressure switch to ground.

20. The dual fuel generator of claim 19, wherein the connection of the primary fuel pressure switch to ground prevents operation of the primary fuel valve switch.

* * * * *